United States Patent
Berry et al.

(10) Patent No.: US 10,339,295 B2
(45) Date of Patent: Jul. 2, 2019

(54) TRACKING WORK BETWEEN SYSTEM ENTITIES

(71) Applicant: Microsoft Technology Licensing, LLC, Redmond, WA (US)

(72) Inventors: Jon Robert Berry, Woodinville, WA (US); Youssef Barakat, Bothell, WA (US); Yevgeniy M. Bak, Redmond, WA (US); Mehmet Iyigun, Kirkland, WA (US); Pedro Miguel Sequeira de Justo Teixeira, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/221,953

(22) Filed: Jul. 28, 2016

(65) Prior Publication Data

US 2018/0032378 A1 Feb. 1, 2018

(51) Int. Cl.
*G06F 21/46* (2013.01)
*G06F 21/44* (2013.01)
*G06F 9/50* (2006.01)

(52) U.S. Cl.
CPC ............ *G06F 21/44* (2013.01); *G06F 9/5027* (2013.01); *G06F 2209/509* (2013.01)

(58) Field of Classification Search
CPC ...... G06F 9/5083; G06F 9/4881; G06F 21/44; G06F 9/50
USPC .......................................................... 726/29
See application file for complete search history.

(56) References Cited

U.S. PATENT DOCUMENTS

| | | | |
|---|---|---|---|
| 7,458,078 B2 | 11/2008 | DeWitt et al. | |
| 8,239,872 B2 | 8/2012 | Tatu | |
| 8,468,539 B2 | 6/2013 | Eichenberger et al. | |
| 8,473,964 B2 | 6/2013 | Jayamohan et al. | |
| 8,924,690 B2 | 12/2014 | Fossum et al. | |
| 8,933,953 B2 | 1/2015 | Jiang et al. | |
| 2002/0194245 A1* | 12/2002 | Simpson | G06F 9/5027 718/101 |
| 2007/0265901 A1* | 11/2007 | Olson | G06Q 10/06 705/28 |
| 2009/0320021 A1 | 12/2009 | Pan et al. | |
| 2009/0327662 A1 | 12/2009 | Jiang et al. | |
| 2010/0031268 A1 | 2/2010 | Dwyer et al. | |
| 2013/0110588 A1* | 5/2013 | Livne | G06Q 10/06 705/7.38 |

(Continued)

OTHER PUBLICATIONS

Zhang, et al., "Relaxed Dependence Tracking for Parallel Runtime Support", In Proceedings of the 25th International Conference on Compiler Construction, Mar. 17, 2016, pp. 45-55.

*Primary Examiner* — Evans Desrosiers
(74) *Attorney, Agent, or Firm* — Liang IP, PLLC

(57) ABSTRACT

A computing system includes one or more processors and a storage device that stores computer executable instructions that can be executed by the processors to cause the computing system to perform the following. The system generates a work tracking information ticket for a first system entity. The system assigns the work tracking information ticket to the first system entity. The system passes the work tracking information ticket to one or more second system entities. The system validates the work tracking information ticket. The validated work tracking information ticket informs that the one or more second system entities are performing work on behalf of the first system entity.

18 Claims, 5 Drawing Sheets

(56) References Cited

U.S. PATENT DOCUMENTS

2013/0125133 A1    5/2013   Schuster
2014/0373021 A1   12/2014   Teixeira et al.
2015/0347178 A1   12/2015   Magee et al.

\* cited by examiner

| 235A | |
|---|---|
| Identifier | 241 (210A) |
| Priority Policies | 255 |
| Authentication Key | 265 |
| Time Stamp | 275 |
| Schedule | 276 |

*Figure 3*

TRACKING WORK BETWEEN SYSTEM ENTITIES

BACKGROUND

System entities such as threads, processes and jobs often do work on behalf of another system entity. However, conventional computing systems often lack an effective and efficient way to track work that is shared across the system entities. Previous solutions for tracking work that is shared across the system entities provided manual means of tracking work as it was transferred from system entity to another system entity. This means that at each instance of work transfer, a system entity would have to opt in to calling the right set of APIs to let the system know that work is being transferred. This did not scale to the countless places where work is being transferred in the system. Another limitation of previous solutions was that they did not incorporate the work tracking information to provide proper resource priority transfer from system entity to system entity (CPU, IO, memory) as work was being transferred. Similarly, previous solutions were not integrated with priority inversion avoidance mechanisms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems and methods for tracking work between system entities of a computing system. In one embodiment, a computing system includes one or more processors and a storage device that stores computer executable instructions that can be executed by the processors to cause the computing system to perform the following. The system generates a work tracking information ticket for a first system entity. The system assigns the work tracking information ticket to the first system entity. The system passes the work tracking information ticket to one or more second system entities. The system validates the work tracking information ticket. The validated work tracking information ticket informs that the one or more second system entities are performing work on behalf of the first system entity.

In another embodiment, a generation component generates a work tracking information ticket for a first system entity. A trusted ticket manager component assigns the generated work tracking information ticket to the first system entity. A validation component receives the work tracking information ticket from one or more second system entities that received the work tracking information ticket from the first system entity. The validation component validates the received work tracking information ticket. The validated work tracking information ticket informs that the one or more second system entities are performing work on behalf of the first system entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates an example embodiment of a work tracking information ticket;

DETAILED DESCRIPTION

Figure 1:
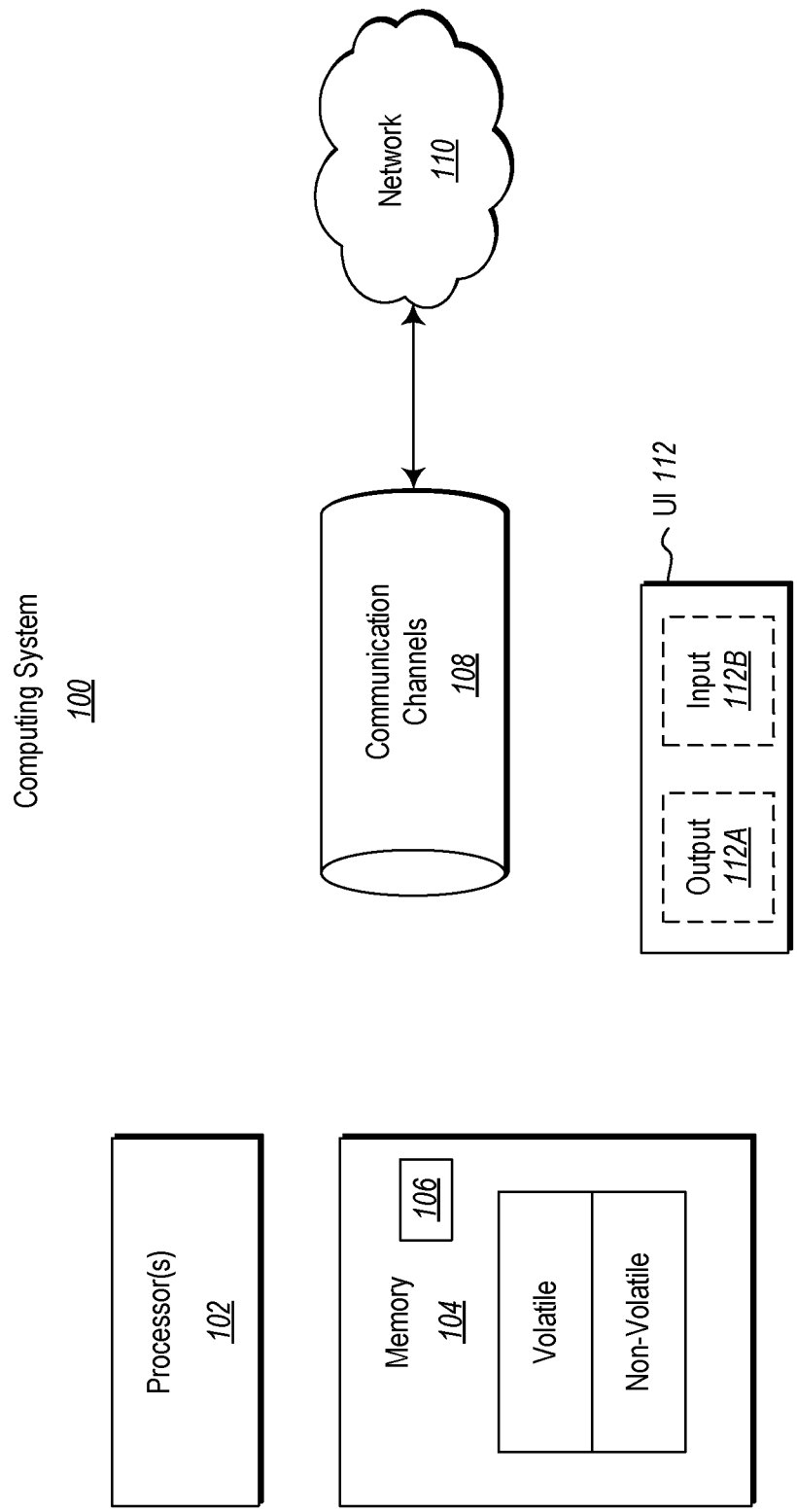
FIG. 1 illustrates an example computing system in which the principles described herein may be employed.

System entities such as threads, processes and jobs that are executed on a computing system often do work on behalf of another system entity. For example, a first system entity may only be able to directly perform some portion of its intended work and may therefore need to request that a second system entity and/or a third system entity perform portions of the work on its behalf. While the second and/or third system entities are able to perform the work on behalf of the first system entity, the computing system is often not able to track the work once the second and/or third system entities begin to do the work on behalf of the first system entity.

This may lead to many potential problems, especially in environments such as a data center where a large number of system entities are executing at the same time. For example, it may be easy for an outside source to spoof or impersonate the second and/or third system entities so that the computing system allows these system entities to do unauthorized work for the outside source. In some cases, such unauthorized work may be charged to the owner or operator of the first system entity.

In other instances, since the computing system in unable to track work done on behalf of the first system entity, the first computing system may be able to have work done on its behalf without that work being properly charged to the owner or operator of the first system entity. For example, in instances where the first system entity is charged for its resource (CPU, memory, IO) usage, if the computing system only charges when the first system entity is actually doing the work, then any work done by the second and/or third system entities on behalf of the first system entity will not be properly charged.

In further instances, since the computing system in unable to track work done on behalf of the first system entity, the computing system may not apply the proper priority or level of service to the work. For example, the first system entity may be entitled to a guaranteed high level of resource usage, while the second and/or third system entities are entitled to a lower level of service. In such cases, when the second and/or third system entities are performing the work on behalf of the first system entity, the lower level of service of the second and/or third system entities may be applied instead of the higher level of service that the first system entity is entitled to.

Aspects of the disclosed embodiments relate to systems and methods for tracking work between one or more system entities. A computing system generates a work tracking information ticket for a first system entity. The system assigns the work tracking information ticket to the first system entity. The system passes the work tracking information ticket to one or more second system entities. The system validates the work tracking information ticket. The validated work tracking information ticket informs that the one or more second system entities are performing work on behalf of the first system entity.

In another embodiment, a generation component generates a work tracking information ticket for a first system entity. A trusted ticket manager component assigns the generated work tracking information ticket to the first system entity. A validation component receives the work tracking information ticket from one or more second system entities that received the work tracking information ticket from the first system entity. The validation component validates the received work tracking information ticket. The validated work tracking information ticket informs that the one or more second system entities are performing work on behalf of the first system entity.

There are various technical effects and benefits that can be achieved by implementing aspects of the disclosed embodiments. By way of example, it is now possible to accurately track work that is performed by system entities on behalf of another system entity. This allows for the proper attribution of the work performed to the originating system entity. Once the work is properly attributed to the originating system entity, correct priorities for work can be maintained and proper resource utilization and energy utilization can be determined. Further, properly attributing the work to the originating system entity makes it easier to prevent spoofing or impersonating of a system entity to thereby perform unauthorized work or to perform work without properly paying for it. Further, the technical effects related to the disclosed embodiments can also include improved system efficiency gains.

Some introductory discussion of a computing system will be described with respect to FIG. 1. Then, the system for tracking work between one or more system entities will be described with respect to FIG. 2 through FIG. 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
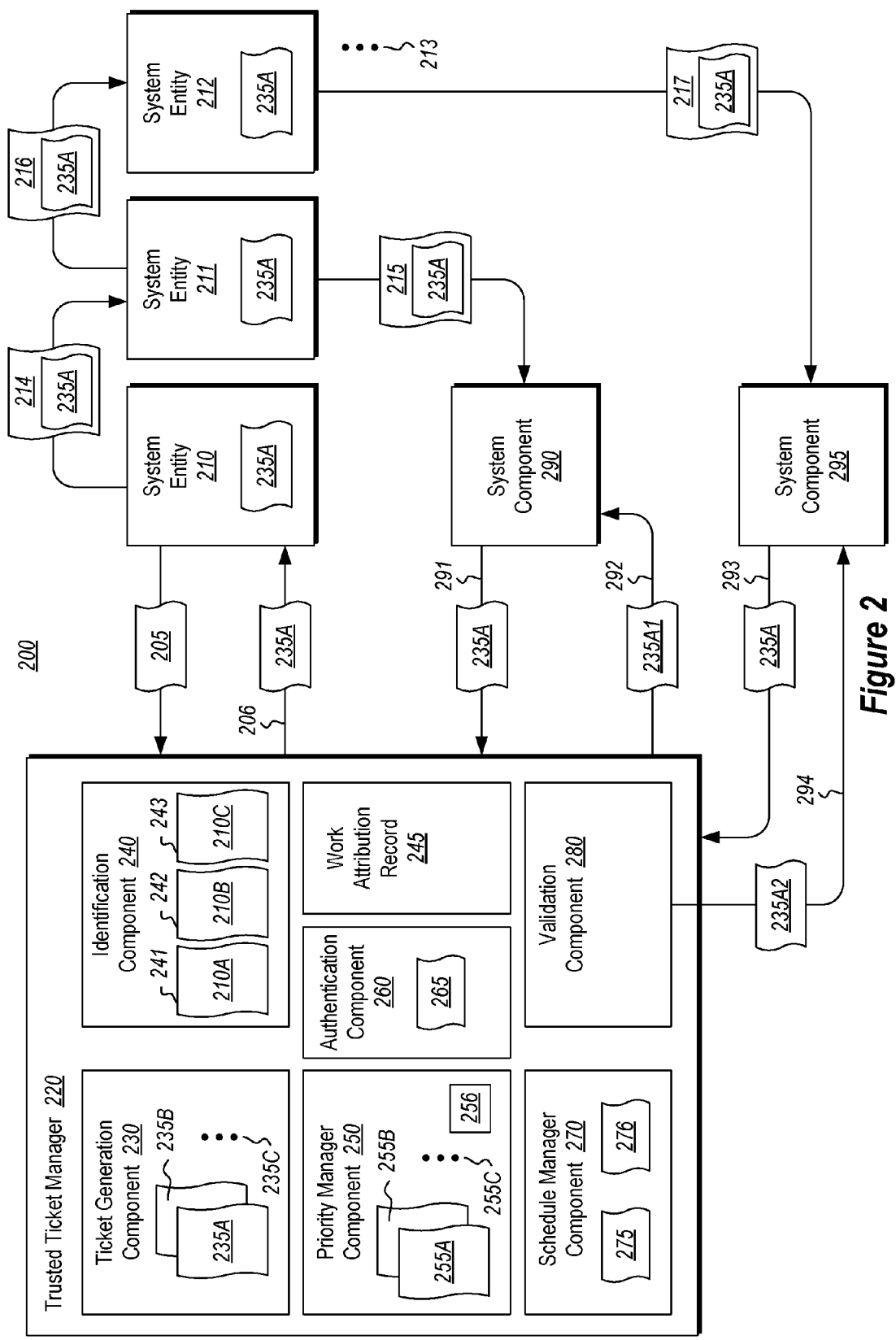
FIG. 2 illustrates an embodiment of a computing system able to track work between system entities.

Attention is now given to FIG. 2, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2 and some of the components may be combined as circumstances warrant. Although not necessarily illustrated, the various components of the computing system 200 may access and/or utilize a processor and memory, such as processor 102 and memory 104, as needed to perform their various functions.

As illustrated in FIG. 2, the system 200 may include a first system entity 210, a second system entity 211, a third system entity 212, and any number of additional system entities as illustrated by ellipses 213. The system entities 210-213 may be an entity that is implemented by or executed by, for example, an operating system of the system 200. The system entities 210-213 may be one or more jobs, one or more processes, or one or more threads associated with a process or a job. In some embodiments, the system entities 210-213 may be associated with a standalone application, a suite of related applications, or one or more integrated development environment applications. The system entities 210-213 may also be associated with one or more add-in-applications or a module such as a dynamic linked library. Accordingly, the embodiments disclosed herein are not limited by the type of the system entities 210-213.

The system 200 may also include a trusted ticket manager component 220 (herein also referred to "trusted ticket manager 220"). In some embodiments, the trusted ticket manager 220 may be the kernel of an operating system. In other embodiments, the trusted ticket manager may be some other trusted entity of the computing system 200. Accordingly, the embodiments disclosed herein are not limited by what constitutes the trusted ticket manager 220 or the location in the computing system of the trusted ticket manager 220. Although shown as a single component or module, this is for ease of illustration only as it is anticipated that the trusted ticket manager and its various components may be implanted as a collection of components and modules that functionally act together as a single component or module, but that are distributed across the computing system 200. In operation, the trusted ticket manager 220 manages the generation, assignment, and validation or decoding of work tracking information tickets as will be described in more detail to follow.

Accordingly, the trusted ticket manager 220 may include a work tracking information ticket generation component 230. In operation, the work tracking information ticket generation component 230 may generate work tracking information tickets (herein also referred to as "work tracking information tickets 235") 235A, 235B, and any number of additional work tracking information tickets as illustrated by ellipses 235C that may be configured to include various work tracking information that may be used by the trusted ticket manager 220 to track work that is performed by and/or on behalf of one or more of the system entities 210-213. Various embodiments of different types of work tracking information that may be included in the work tracking information tickets 235 will be explained in more detail to follow. Accordingly, the embodiments disclosed herein are not limited by the type or amount of work tracking information that may be included in the work tracking information tickets 235.

The trusted ticket manager 220 may include an identification component 240. In operation, the identification component may generate identifiers for the system entities or it may access identifiers that have been generated by other elements of the computing system 200. For example, the identification component 240 may generate or access an identifier 241 labeled "210A" that identifies the system entity 210, an identifier 242 labeled "211A" that identifies the system entity 211 and an identifier 243 labeled "212A" that identifies the system entity 212. Although not illustrated, the identification component 240 may also generate or access an identifier for the various system entities 213. The identification component 240 may provide one or more of the identifiers to the work tracking information ticket generation component 230 for inclusion in a work tracking information ticket 235.

The trusted ticket manager 220 may also include a priority manager component 250. In operation, the priority manager component 250 includes one or more priority policies (herein after also referred to collectively as "priority policies 255") 255A, 255B, and any number of additional priority policies as illustrated by the ellipses 255C. The priority policies 255 may be directed to priorities or level of service guarantees for one or more resources of the computing system 200 such as processing resources, memory allocation, IO resources and the like that may be applied to the system entities 210, 211, 212, and 213. The priority policies 255 may also apply to other operational aspects of the computing system 200.

As may be appreciated, it may be possible for an outside source to counterfeit or spoof a work tracking information ticket 235 by generating a false work tracking information ticket or by hacking into an existing work tracking information ticket and then assigning such work tracking information to one of the system entities to thereby impersonate the one of the system entities. Accordingly, in some embodiments, the trusted ticket manager 220 may also include an authentication component 260. In operation, the authentication component is configured to help prevent the spoofing of the work tracking information tickets 235 by making the work tracking information tickets cryptographically secure so that the outside source is not able to spoof the work tracking information tickets.

In one embodiment, the authentication component 260 may include an authentication key 265 that may be used to encode and then decode a work tracking information ticket 235 using any reasonable encoding and decoding process. The authentication component 260 may provide the authentication key 265 to the work tracking information ticket generation component 230 for inclusion in a work tracking information ticket 235. As will be explained in more detail to follow, the authentication key 265 may be used to verify that a work tracking information ticket 235 has not been spoofed when the ticket is passed from one system entity to another system entity.

In other embodiments, the trusted ticket manger 220 may also include a schedule manager component 270. In operation, the schedule manager component 270 may generate a time stamp 275 that may be provided to the work tracking information ticket generation component 230 for inclusion in a work tracking information ticket 235. The time stamp 275 may specify an amount of time that a work tracking information ticket 235 is valid. As may be appreciated, use of the time stamp 275 may help to prevent the use of a work tracking information ticket 235 for longer than its intended duration.

The operation of the computing system 200 will now be explained. The system entity 210 may perform some piece of work. As is often common in many computing systems, the system entity 210 may only be able to directly perform some portion of the work and may therefore need to request that the system entity 211 and/or the system entity 212 perform portions of the work on its behalf. Accordingly, as shown in FIG. 2, in one embodiment the system entity 210, prior to making the request to the one or more other system entity, may make a request 205 for a work tracking information ticket 235 from the trusted ticket manager 220. This may be done by calling one or more APIs associated with the trusted ticket manager 220. In an alternative embodiment, the system entity 210 need not initiate the request for a work tracking information ticket 235. In such embodiments, the trusted ticket manager 220 may automatically generate and provide the work tracking information ticket 235 to the system entity 210 without the system entity 210 requesting the ticket.

The work tracking information ticket generation component 230, either in response to the request 205 or automatically, may generate a work tracking information ticket 235, such as work tracking information ticket 235A, for the system entity 210. As previously mentioned, the ticket generation component 230 may include various different types of work tracking information in the work tracking information ticket 235A. Once the work tracking information ticket 235A has been generated, it may be assigned by the trusted ticket manager 220 to the system entity 210 as shown at 206.

FIG. 3 illustrates an embodiment of the work tracking information ticket 235A. In the embodiment, the work tracking information ticket 235A may include the identifier 241 (210A) that identifies the system entity 210, one or more of the priority policies 255 that define the priority for the system entity 210, the authentication key 265 which may be used to encode and decode the work tracking information ticket 235A, and the time stamp 275 which may define how long the work tracking information ticket 235A is to remain valid. In some embodiments, the work tracking information ticket 235A may include a schedule 276 as will be discussed in more detail to follow.

It will be appreciated that the work tracking information ticket 235A may include more or less information that is shown in FIG. 3. In other words, the work tracking information ticket 235A may only include, for example, the identifier 241 (210A) as this is usually needed to identify the originating system entity, although some embodiments may not include the identifier 241 (210A). Accordingly, the embodiments disclosed herein are not limited to any specific configuration of the work tracking information ticket 235A.

Once the system entity 210 has received the work tracking information ticket 235A that has been assigned to it, the system entity 210 may make a request or call 214 to the system entity 211 to perform some portion of the work on its behalf. The request or call 214 may be an Inter-Process Communication (IPC), a Remote Procedure Call (RPC), a Local Procedure Call (LPC), or some other type of system call. The work may also be queued to a local thread pool. Accordingly, the embodiments disclosed herein are not limited by the type of the request 214 (or request 216). The work tracking information ticket 235A may be included in the request 214 as illustrated in the figure. In some embodiments, this may be done automatically or via flags supplied by the caller.

The system entity 211 may receive the request 214 and may extract the work tracking information ticket 235A from the request. The system entity 211 may then attempt to perform the portion of the work on behalf of the system entity 210 specified in the request 214. Accordingly, the system entity may provide a call 215 to a system component 290 to perform the specified work. For example, suppose that the specified work was an Input/Output (IO) operation. In such case, the call 215 may be an IO call and the system component 290 may be an IO manager. It will be appreciated that the call 215 may be any type of appropriate system call and the system component 290 may be any type of system component that is appropriate for the system call.

The call 215 may include the work tracking information ticket 235A. Since the system component 290 may not know if the work tracking information ticket 235A has properly been received by the system entity 211 from the system entity 210 or has been maliciously placed there by an outside source to thereby spoof the system entity 210, the system component 290 may provide the work tracking information ticket 235A to the trusted ticket manager 220 for validation as denoted at 291.

Accordingly, the trusted ticket manager 220 may include a validation or decode component 280 that is configured to determine that the work tracking information ticket 235A is valid by decoding the work tracking information ticket 235A. In the present embodiment, where the work tracking information ticket 235A includes the authentication key 265, the validation component 280 may use the authentication key 265 to decode the ticket. For example, if the work tracking information ticket 235A is a valid ticket, then the authentication key 265 would match the authentication key 265 of the authentication component 260 and the work tracking information ticket 235A may be decoded. If the authentication keys do not match, then the validation component 280 will not decode the work tracking information ticket 235A as it is likely that the work tracking information ticket 235A has been spoofed in some way. As mentioned previously, in some embodiments the work tracking information ticket 235A need not include the authentication key 265.

In addition, since the work tracking information ticket 235A includes the identifier 241 (210A) for the system entity 210, the validation module 280 may access the identification component 240 to ascertain that the identifier 241 (210A) included in the work tracking information ticket 235A received from the system component 290 matches the identifier 241 (210A) provided in the work tracking information ticket 235A generated for system entity 210. If the identifiers are the same, then the validation component 280 may verify that the system entity 211 is doing work on behalf of the system entity 210.

In those embodiments where the work tracking information ticket 235A includes the time stamp 275, the validation component 280 may also verify that the time stamp 275 is still valid. If the time stamp is valid, then the validation component 280 is able to infer that they system entity 211 is authorized to perform the work on behalf of the system entity 210. As may be appreciated, use of the time stamp 275 ensures that the system entity 211 is not able to indefinitely claim authorization from system entity 210 to perform work once the work is completed. This is turn helps to prevent an outside source from indefinitely continuing to use the system entity 211 for work and having that work attributed to the system entity 210. As mentioned previously, in some embodiments the work tracking information ticket 235A need not include the time stamp 275.

Once the validation component has validated the work tracking information ticket 235A, it may send a message 235A1 to the system component 290 as denoted at 292. In the case where the validation component 280 determines that the work tracking information ticket 235A is not valid, the message 235A1 may inform the system component 290 that the system entity 211 is not doing work on behalf of the system 210. In some embodiments, this message may be in form of an error message. In such case, the system component 290 may not allow the system entity 211 to perform the specified work. For example, in the embodiment where the specified work is an IO operation and the system component 290 is an IO manager, the system component 290 will prevent the IO operation from occurring. In other embodiments, when the work tracking information ticket 235A is found to be not valid, the system simply ignores it as if it had not been implemented at all. As discussed above, this helps prevent system entity 211 from pretending to do work on behalf of the system entity 210.

In the case where the validation component 280 determines that the work tracking information ticket 235A is valid, the message 235A1 may include a decoded version of the work tracking information included in work tracking information ticket 235A. For example, the message 235A1 may include the identity 241 (210A) of the system entity 210 and it may also include the priority policies 255. The message 235A1 may also include other work tracking information as circumstances warrant.

Accordingly, the message 235A1 may inform the system component 290 that the system entity 211 is in fact doing work on behalf of the system entity 210. The system component 290 may then allow the system entity 211 to perform its specified work since it has been determined that the work that is to be performed by the system entity 211 is attributable to the system entity 210. For example, in the embodiment where the specified work is an IO operation and the system component 290 is an IO manager, the system component 290 will allow the IO operation to occur. Once the system entity 211 has completed its specified work, the computing system 200 may remove the work tracking information ticket 235A from the system entity 211 so that the system entity 211 is no longer able to perform work on behalf of the system entity 210.

Once it has been verified that the system entity 211 is performing work on behalf of the system entity 210, the system component 250 may apply one or more of the priority policies 255 to the system entity 211 as though the priority policies 255 were being applied to the system entity 210. In other words, the system component 290 may treat the system entity 211 in the same manner it would treat the system entity 210 because the system entity 211 is performing the work on behalf of the system entity 210.

In one embodiment, one or more of the memory priority policies 255 may specify or guarantee a quality of service level for the computing resources (CPU, memory, IO) for the system entity 210. For example, suppose the priority policy 255A specified that the system entity 210 should have a high level of service and that the system entity 211 should have a lower level of service. Further suppose that the system component 290 was having high usage so that its ability to handle all requested work was impacted. If the system component 290 applied the priority policy 255A to the system entity 211 without knowing that the system entity 211 was doing work on behalf of system entity 210, then it would give the system entity 211 the lower level of service. This would lead to the work being done at a lower level of service than system entity 210 is guaranteed or entitled to, which is also known to those of skill in the art as a priority inversion.

However, because the system component 290 knows that the system entity 211 is doing the work on behalf of the system entity 210, the system component 290 may ensure that the system entity 211 is given the same level of service that system entity 210 would be given. Accordingly, the system entity 211 would be given the higher level of service when its work is performed. In this way, the system entity 210 is able to have its work performed at its guaranteed quality of service level even when that work is performed by one or more of the system entities 211, 212, or 213.

In like manner, the system entity 210 is prevented from receiving a higher level of service that it is entitled to. For example, suppose the priority policy 255A specified that the system entity 210 would have a lower level of service and that the system entity 211 would have a higher level of service. Further suppose that the system component 290 was having high usage so that its ability to handle all requested work was impacted. If the system component 290 applied the priority policy 255A to the system entity 211 without knowing that the system entity 211 was doing work on behalf of system entity 210, then it would give the system entity 211 the higher level of service. This would lead to the work being done at a higher level of service than system entity 210 is guaranteed or entitled to.

However, because the system component 290 knows that the system entity 211 is doing the work on behalf of the system entity 210, the system component 250 may ensure that the system entity 211 is given the lower level of service. Thus, even though the system entity 211 may be entitled to receive the higher level of service when performing work on its own behalf, such level of service is not guaranteed when it is performing work on behalf of the system entity 210. Thus, the system entity 210 is prevented from receiving a higher level of service that it is entitled to.

Accordingly, use of the work tracking information ticket 235A allows the computing system 200 to avoid priority inversions as the system is able to give the system entity doing work on behalf another system entity the higher priority of the originating system entity. In addition, the system is able to prevent one system entity from gaining a higher priority than it is entitled to.

In some embodiments, the priority of the system entity 210 may change after is has provided the work tracking information ticket 235A to the system entity 211. In such embodiments, system component 290 may apply the wrong priority if the priority policies 255 included in the work tracking information ticket 235A are not updated to reflect the change in priority. Accordingly, the trusted ticket manager 220 or some other element of the computing system 200 may maintain enough state information to observe when the priority of the system entity 210 changes. The trusted ticket manager 220 may then reflect or provide this change in priorities to the system entities 211, 212 and/or 213 that are doing work on behalf of the system entity in any reasonable manner. In the illustrated embodiment, the priority manager component 250 may include a link 256 that may be included in the work tracking information ticket 235A. Whenever the priority of the system entity 210 changes, the link 256 may be used to reflect this change in the system entity 211. Thus, the priority of the originating system entity may be kept up to date in any system entity doing work on its behalf. Of course, it will be appreciated that the link 256 is not the only way for the trusted ticket manager 220 to reflect or provide the updated priority information.

In some embodiments, the system entity 211 may be able to perform only a portion of the work that was specified in the request or call 214. The system entity 211 may make a request or call 216, which may correspond to the request or call 214, to the system entity 212 to perform a portion of the work. The request or call 216 may include the work tracking information ticket 235A as illustrated.

The system entity 212 may receive the request 216 and may extract the work tracking information ticket 235A from the request. Accordingly, even though the request 216 was received from the system entity 211, by including the work tracking information ticket 235A, any work done by the system entity 212 may be attributed to the system entity 210.

The system entity 212 may then attempt to perform the portion of the work on behalf of the system entity 210 specified in the request 216. Accordingly, the system entity may provide a call 217 to a system component 295, which in some embodiments may be the same as the system component 290, to perform the specified work. The system component 295 may then provide the work tracking information ticket 235A to the validation component 280 for validation as denoted at 293. Since the validation process will be the same as that described previously in relation to system entity 211, the process need not be described here. The validation component 280 may then send a message 235A2 to the system component 295 that either specifies that the work tracking information ticket 235A is invalid or that specifies that the system entity 212 is preforming work on behalf of the system entity 210 and that provides the decoded work tracking information to the system component 295. The system component 295 may then use the decoded work tracking information to allow the system entity 212 to perform its work and may also apply any priority policies 255 in the manner previously described.

In some embodiments the system entity 212 may be able to only perform a portion of its specified work. Although not illustrated, the system entity 212 may send a request for a portion of the work with the work tracking information ticket 235A to one or more of the system entities 213. The system entity 213 may then extract the work tracking information ticket 235A and perform the work in the manner previously described. In this way, any work performed by the system entity 213 may be attributable to the system entity 210. The process of providing the work tracking information ticket 235A may be repeated as many times as necessary for any number of the system entities 213. Accordingly, use of the work tracking information ticket 235A allows for work performed by any number of system entities to be attributed to the system entity 210.

Although FIG. 2 illustrates the work tracking information ticket 235A being provided from the system entity 210 to the system entity 211 and then from the system entity 211 to the system entity 212 is a sequential fashion, this need not be the case. In some embodiments, the system entity 210 may provide the work tracking information ticket 235A to the system entity 211 and the system entity 212 (and to one or more of the system entities 213) at the same time. These system entities may then provide the work tracking information ticket 235A to any number of the system entities 213 at the same time as circumstances warrant. Accordingly, the embodiments disclosed herein are not limited by the sequence and/or number of system entities that the work tracking information ticket 235A is provided to.

In some embodiments, the trusted ticket manager 220 may include or have access to a work tracking table or record 245. The work tracking table or record 245 may be used to record which system entities are doing work on behalf of another system entity. For example, when the validation component 280 validates the work tracking information ticket 235A that was provided to the system entity 211, a record may be made in the work tracking table or record 245 indicating that the system entity 211 is doing work on behalf of the system entity 210. When the system entity 211 has completed its specified work, then the record in the work tracking table or record 245 may be removed since the system entity 211 is no longer doing work on behalf of the system entity 210.

Likewise, when the validation component 280 validates the work tracking information ticket 235A that was provided to the system entity 212 and/or to any of the system entities 213, a record may also be made in the work tracking table or record 245 indicating that the system entity 212 and/or one of the system entities 213 is doing work on behalf of the system entity 210. These records may also be removed when the system entity is no longer performing work on behalf of the system entity 210. In this way, the computing system 200 is able to attribute work done by one system entity to the system entity that originated the work.

Once the computing system 200 is able to attribute work being done on behalf of one system entity to the originating system entity, either through use of the work tracking table or record 245 or simply by use of the work tracking information tickets 235, the computing system is able to properly account for resource and/or energy usage of the originating system entity. For example, suppose that when the system entity 211 or the system entity 212 performs work on behalf of the system entity 210 in the manner previously described that there is a spike in the use of one or more of the processing resources, memory resources, IO resources, or other system resources. Because the computing system is able to attribute this work to the system entity 210, the computing system can properly attribute the spike in the resource usage to the system entity 210, even though the spike did not occur when the system entity 210 was performing its portion of the work. In this way, the system entity 210 is not able to have other system entities use system resources on its behalf without it being attributable to the system entity 210. Likewise, if when the system entity 211 or the system entity 212 performs work on behalf of the system entity 210 in the manner previously described that there is a spike in energy usage, the computing system is also able to attribute this increased energy usage to the system entity 210 and not to the system entities 211 or 212.

Advantageously, in embodiments where system entities are charged for their computing resource use or energy use, properly attributing the resource use to the originating system entity allows for the proper party to be charged. In other words, the system entities 211 and 212 will not be charged for the resource or energy usage they consume on behalf of the system entity 210. Further, knowing what system entity is causing increased resource or energy usage may allow the computing system to more efficiently plan when to execute the originating system entity in view of the other system entities that are also executing on the system.

As mentioned previously, in some embodiments the trusted ticket manager 220 and the system components 290 and 295 may be part of the kernel of an operating system. Accordingly, when the request or call 214 and 216 are kernel-mode callers such as an IPC call, the system goes through a kernel mode transition and it may take little additional computing resources to attach and then decode the work tracking information ticket 235A in the manner previously described. In other embodiments, one or more of the system entities 210-213 may be operating in the user mode (i.e., user mode thread pool) and thus may require an explicit kernel mode call to decode the work tracking information tickets 235. However, this may consume a large amount of computing resources if the explicit kernel mode call is made every time a system entity attempts to perform work on behalf of another system entity.

Figure 4:
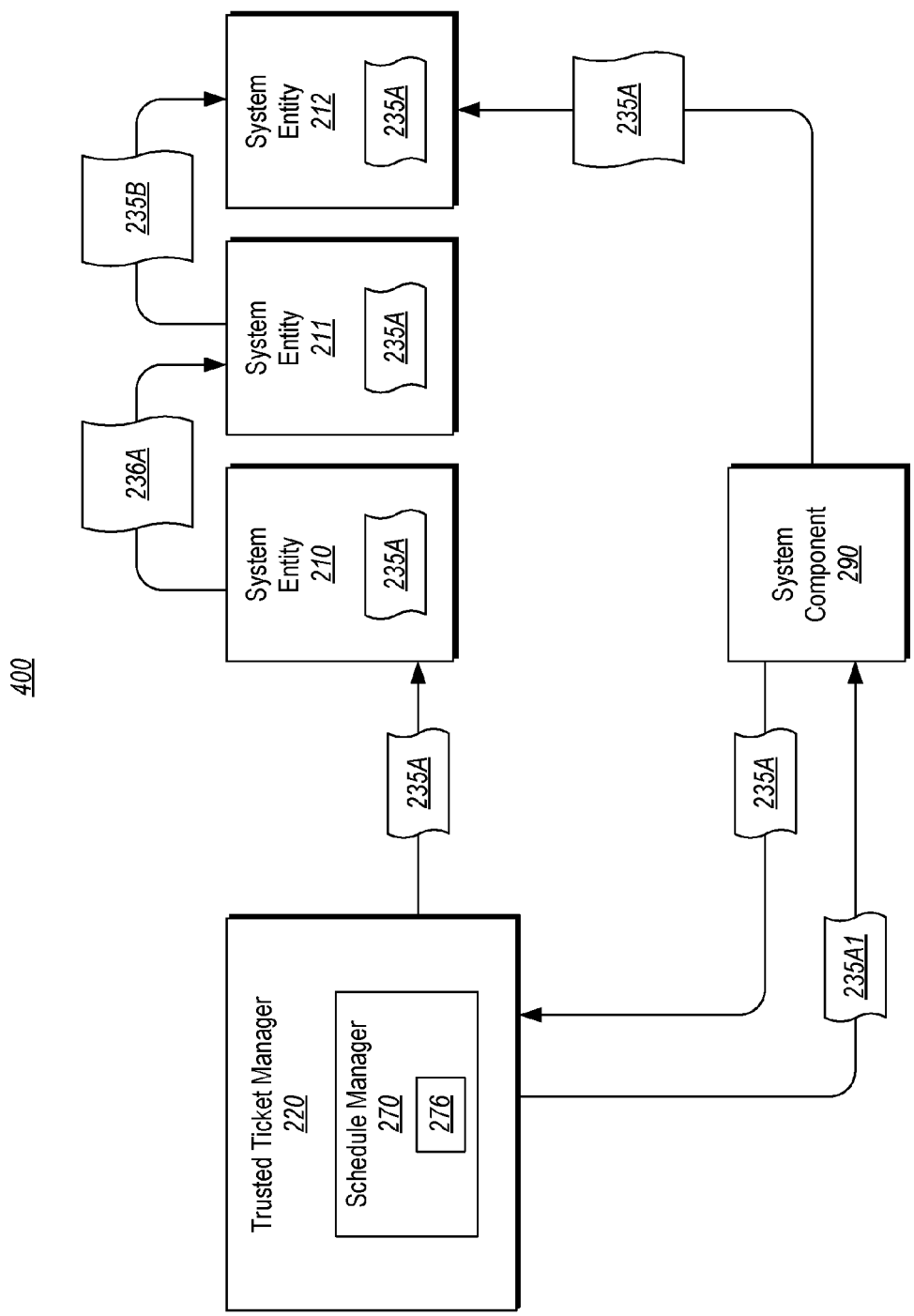
FIG. 4 illustrates an embodiment of the computing system of FIG. 2.

FIG. 4 illustrates an alternative embodiment of the computing system 200 where the system entities 210-212 may be operating in the user mode. Those elements that are the same in FIG. 4 as in FIG. 2 may not be explained in further detail in relation to FIG. 4. In the embodiment, the trusted ticket manager 220 attaches the work tracking information ticket 235A to the system entity 210 and passes the work tracking information ticket 235A to the system 211 as previously described. However, in the embodiment the system entity 211 may extract the work tracking information ticket 235A and perform its work on behalf of the system entity 210 without validating the work tracking information ticket 235A. The system entity 212 may also extract the work tracking information ticket 235A and perform its work on behalf of the system entity 210.

At some point, however, it may be necessary to validate the work tracking information ticket 235A. Accordingly, in one embodiment the schedule component 270 may generate a schedule 276 that may be included in the work tracking information ticket 235A. In operation, the schedule 276 may specify that the work tracking information ticket 235A be validated during the next kernel-mode transition that would occur in the normal course of operation. Alternatively, the schedule 276 may specify that the validation occur whenever one or more of the priority policies 255 are enforced by the computing system. In a further alternative, the schedule 276 may specify a time amount of how often the validation occurs. In any case, use of the schedule 276 allows for the efficient use of the work tracking information ticket 235A without using undue computing resources overhead in those embodiments where kernel-mode transitions do not occur regularly.

In other embodiments, the trusted ticket manager 220 or some other element of the computing system 200 may determine when an appropriate time to validate the tracking information ticket 235A or even when to apply the work tracking information ticket 235A that has been extracted by one or more of the system entities 211, 212, and 213 without the need for the schedule 276. In such embodiments, the schedule 276 is not included in the work tracking information ticket 235A or even necessarily generated. Rather, the trusted ticket manager 220 automatically determines when to validate and/or apply the work tracking information ticket 235A as appropriate.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
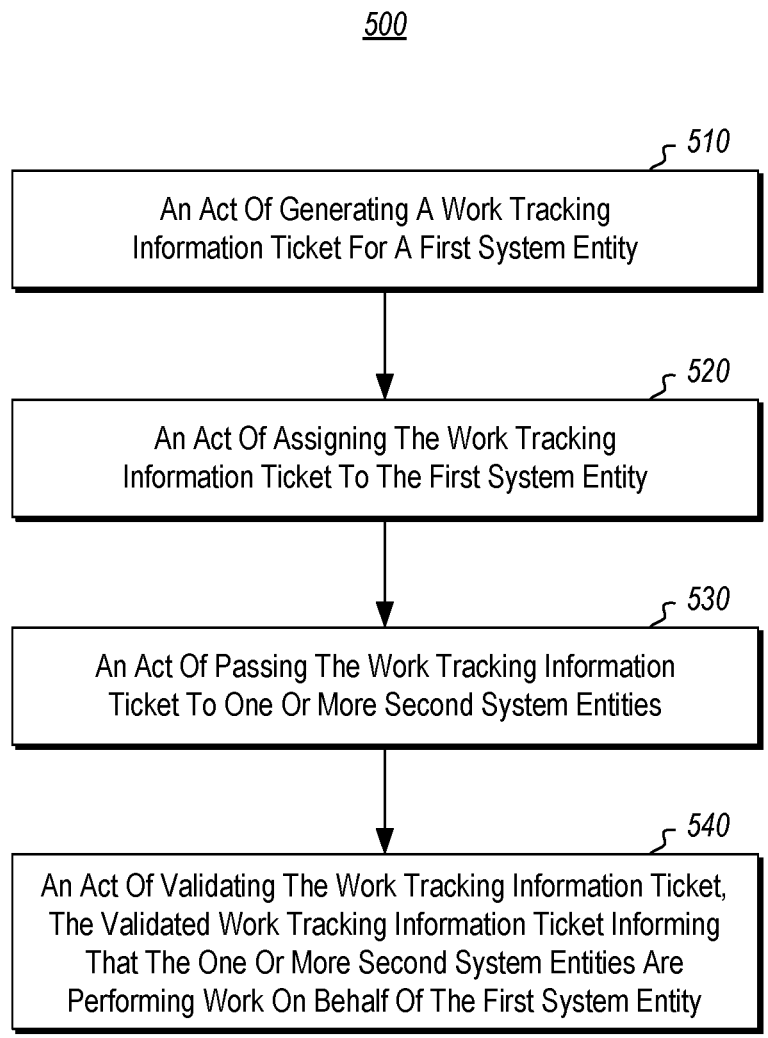
FIG. 5 illustrates a flow chart of an example method for tracking work between a plurality of system entities.

FIG. 5 illustrates a flow chart of an example method 500 for tracking work between a plurality of system entities. The method 500 will be described with respect to one or more of FIGS. 2-4 discussed previously.

The method 500 includes an act of generating a work tracking information ticket for a first system entity (act 510). For example as previously discussed, the work tracking information ticket generation component 230 may generate one or more work tracking information tickets 235, such as work tracking information ticket 235A, for the system entity 210. The work tracking information tickets 235 may include various work tracking information such as, but not limited to, an identifier 241-243 for a system entity, priority policies 255, an authentication key 265, and a time stamp 275.

The method 500 includes an act of assigning the work tracking information ticket to the first system entity (act 520). For example as previously discussed, the trusted ticket manager 220 may assign the generated work tracking information tickets 235A to the system entity 210.

The method 500 includes an act of passing the work tracking information ticket to one or more second system entities (act 530). For example, as previously discussed, the system entity 210 may pass the work tracking information tickets 235A to one or more of the system entities 211, 212, and 213 in the manner described above.

The method 500 includes an act of validating the work tracking information ticket (act 540). The validated work tracking information ticket informs that the one or more second system entities are performing work on behalf of the first system entity. For example, as previously discussed the validation component 280 may validate the work tracking information tickets 235A in the manner described above. The validated work tracking information tickets 235A may then be used to attribute work performed by one or more of the system entities 211, 212, and 213 to the system entity 210 in the manner discussed above to thereby provide the various advantages also discussed above.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented in a computer having a processor and a memory with instructions executable by the processor to provide an operating system and first and second processes, the method comprising:

receiving, at the operating system, a first request from the first process for a ticket of work tracking;

in response to the received first request, generating and assigning a first ticket to the first process, wherein the generating and assigning include encoding the first ticket with an authentication key accessible by the operating system; and subsequently, at the operating system, receiving a second request from the second process for validating a second ticket as being attributable to the first process, the second request indicating that the first process has requested the second process to perform work for the first process by passing to the second process the first ticket;

determining whether the received second ticket from the second process is a valid ticket assigned to the first process, wherein the determining includes decoding the received second ticket with the authentication key; and in response to determining that the second ticket is a valid ticket assigned to the first process, instructing the second process to perform the work for the first process; and recording the work performed by the second process as attributable to the first process.

2. The method of claim 1, further comprising, in response to determining that the second ticket is a valid ticket assigned to the first process, transmitting, from the operating system to the second process a message containing an identity of the first process and optionally a priority policy for performing the work requested by the first process, the priority policy allowing the second process to perform the work according to a priority level of the first process instead of another priority level of the second process.

3. The method of claim 1, further comprising, in response to determining that the second ticket is not a valid ticket of the first process, preventing the second process to perform the work for the first process.

4. The method of claim 1 wherein:
generating and assigning the first ticket to the first process further includes generating, at the operating system, an identifier of the first process; and
recording the work performed by the second process as attributable to the first process includes recording the work performed by the second process as corresponding to the generated identifier of the first process.

5. The method of claim 1 wherein:
generating and assigning the first ticket to the first process further includes generating, at the operating system, a first identifier of the first process;
the second ticket contains a second identifier; and
determining whether the received second ticket from the second process is a valid ticket assigned to the first process further includes determining whether the first identifier matches the second identifier.

6. The method of claim 1 wherein:
the generated and assigned first ticket to the first process includes a first authentication key;
the second ticket contains a second authentication key; and
determining whether the received second ticket from the second process is a valid ticket assigned to the first process further includes determining whether the first authentication key matches the second authentication key.

7. The method of claim 1, further comprising, upon the second process completes the work requested by the first process, removing the second ticket from the second process, thereby disallowing the second process to perform additional work on behave of the first process.

8. The method of claim 1, further comprising:
subsequently, at the operating system,
receiving a third request from a third process for validating a third ticket as being attributable to the first process, the request indicating that the second process has requested the third process to perform a portion of the work for by passing to the third process the second ticket;
determining whether the received third ticket from the third process is a valid ticket assigned to the first process; and
in response to determining that the third ticket is a valid ticket assigned to the first process,
instructing the third process to perform the portion of the work for the first process; and
recording the portion of the work performed by the third process as attributable to the first process.

9. A computing device, comprising:
a processor and a memory with instructions executable by the processor to provide an operating system and first and second processes, the memory also including instructions executable by the processor to cause the computing device to:
upon receiving, at the operating system, a first request from the first process for a ticket of work tracking, generate and assign a first ticket to the first process by encoding the first ticket with an authentication key accessible by the operating system; and
subsequently, at the operating system, upon receiving a second request from the second process for validating a second ticket as being attributable to the first process, determine whether the received second ticket from the second process is a valid ticket assigned to the first process by decoding the received second ticket with the authentication key; and
in response to determining that the second ticket is a valid ticket assigned to the first process,
instruct the second process to perform the work for the first process; and
record the work performed by the second process as attributable to the first process.

10. The computing device of claim 9 wherein the memory includes additional instructions executable by the processor to cause the computing device to, in response to determining that the second ticket is a valid ticket assigned to the first process, transmit, from the operating system to the second process a message containing an identity of the first process and optionally a priority policy for performing the work requested by the first process, the priority policy allowing the second process to perform the work according to a priority level of the first process instead of another priority level of the second process.

11. The computing device of claim 9 wherein the memory includes additional instructions executable by the processor to cause the computing device to, in response to determining that the second ticket is not a valid ticket of the first process, prevent the second process to perform the work for the first process.

12. The computing device of claim 9 wherein:
to generate and assign the first ticket to the first process further includes to generate, at the operating system, an identifier of the first process; and
to record the work performed by the second process as attributable to the first process includes to record the work performed by the second process as corresponding to the generated identifier of the first process.

13. The computing device of claim 9 wherein:
to generate and assign the first ticket to the first process further includes to generate, at the operating system, a first identifier of the first process;
the second ticket contains a second identifier; and
to determine whether the received second ticket from the second process is a valid ticket assigned to the first process further includes to determine whether the first identifier matches the second identifier.

14. The computing device of claim 9 wherein:
the generated and assigned first ticket to the first process includes a first authentication key;
the second ticket contains a second authentication key; and
to determine whether the received second ticket from the second process is a valid ticket assigned to the first process includes to determine whether the first authentication key matches the second authentication key.

15. A method implemented in a computer having a processor and a memory with instructions executable by the processor to provide an operating system and first and second processes, the method comprising:

transmitting, from the first process to the operating system, a first request for a ticket of work tracking;

in response to the transmitted first request, receiving, at the first process, a copy of the ticket from the operating system; and subsequently, transmitting, from the first process to the second process, a second request to perform work for the first process, the second request including a copy of the received ticket from the operating system;

transmitting, from the second process to the operating system, a third request for validating the second request from the first process, the third request including a copy of the received ticket from the first process;

determining, at the operating system, whether the received copy of the ticket included in the third request from the second process is a valid ticket assigned to the first process; and in response to determining that the copy of the ticket included in the third request is a valid ticket assigned to the first process, at the operating system, instructing the second process to perform the work for the first process; and recording the work performed by the second process as attributable to the first process.

16. The method of claim 15, further comprising, in response to determining that the copy of the ticket included in the third request is a valid ticket assigned to the first process, transmitting, from the operating system to the second process a message containing an identity of the first process and optionally a priority policy for performing the work requested by the first process, the priority policy allowing the second process to perform the work according to a priority level of the first process instead of another priority level of the second process.

17. The method of claim 15, further comprising, in response to determining that the copy of the ticket included in the third request is not a valid ticket assigned to the first process, preventing the second process to perform the work for the first process.

18. The method of claim 15 wherein:

generating and assigning the ticket to the first process includes generating, at the operating system, an identifier of the first process; and recording the work performed by the second process as attributable to the first process includes recording the work performed by the second process as corresponding to the generated identifier of the first process.

\* \* \* \* \*